(12) United States Patent
Churchland et al.

(10) Patent No.: US 8,414,720 B2
(45) Date of Patent: Apr. 9, 2013

(54) SYSTEMS AND METHODS FOR MANUFACTURING COMPOSITE WOOD PRODUCTS TO REDUCE BOWING

(75) Inventors: Mark T. Churchland, Vancouver (CA); M. Tekamul Buber, Delta (CA)

(73) Assignee: Weyerhaeuser NR Company, Federal Way, WA (US)

(*) Notice: Subject to any disclaimer, the term of this patent is extended or adjusted under 35 U.S.C. 154(b) by 298 days.

(21) Appl. No.: 12/819,929

(22) Filed: Jun. 21, 2010

(65) Prior Publication Data

US 2011/0308695 A1 Dec. 22, 2011

(51) Int. Cl.
*B29B 13/08* (2006.01)
*B29C 65/14* (2006.01)
*B32B 21/02* (2006.01)

(52) U.S. Cl.
USPC .......... 156/62.2; 156/272.2; 156/275.7; 156/379.6; 264/460; 264/489; 264/118

(58) Field of Classification Search .......... 156/62.2, 156/272.2, 275.7, 379.6; 264/460, 463, 489, 264/109, 118
See application file for complete search history.

(56) References Cited

U.S. PATENT DOCUMENTS

| | | | |
|---|---|---|---|
| 4,020,311 A | 4/1977 | Churchland | |
| 4,456,498 A | 6/1984 | Churchland | |
| 4,517,148 A | 5/1985 | Churchland | |
| 4,706,799 A | 11/1987 | Churchland et al. | |
| 5,228,947 A | 7/1993 | Churchland | |
| 5,756,975 A * | 5/1998 | Harris et al. | 219/696 |
| 5,913,990 A | 6/1999 | Kramer | |
| 6,201,224 B1 | 3/2001 | Churchland et al. | |
| 7,048,825 B2 | 5/2006 | Churchland et al. | |
| 7,070,676 B2 | 7/2006 | Churchland et al. | |
| 7,258,761 B2 | 8/2007 | Liu et al. | |
| 2008/0110565 A1 | 5/2008 | Parker | |

FOREIGN PATENT DOCUMENTS

| | | |
|---|---|---|
| CA | 2713382 A1 | 7/2009 |
| WO | 9203027 | 2/1992 |

* cited by examiner

*Primary Examiner* — Michael Tolin
(74) *Attorney, Agent, or Firm* — Christensen O'Connor; Johnson Kindness PLLC

(57) ABSTRACT

The present disclosure includes systems and methods for manufacturing a composite wood product. In some embodiments, the method includes the steps of forming a mat from a plurality of wood elements and an adhesive, the mat having a width W measured substantially perpendicular to a longitudinal axis of the mat and an initial thickness T1. The mat is then moved in a machine direction, the machine direction being substantially parallel to the longitudinal axis and the temperature across the width W of the mat is adjusted. The mat is then compressed into a billet having a final thickness T2. In some embodiments, the system includes a continuous movement mechanism, a side preheat assembly, and a press assembly.

10 Claims, 19 Drawing Sheets

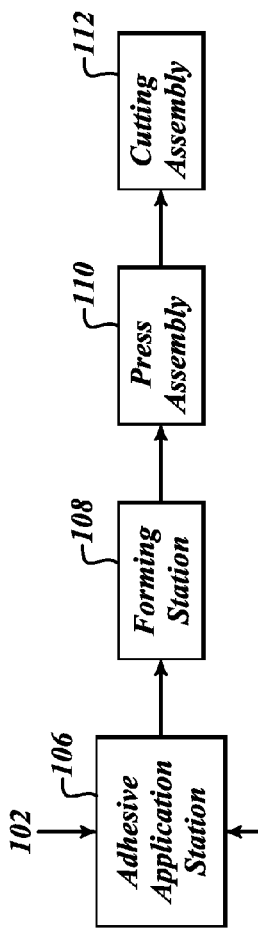
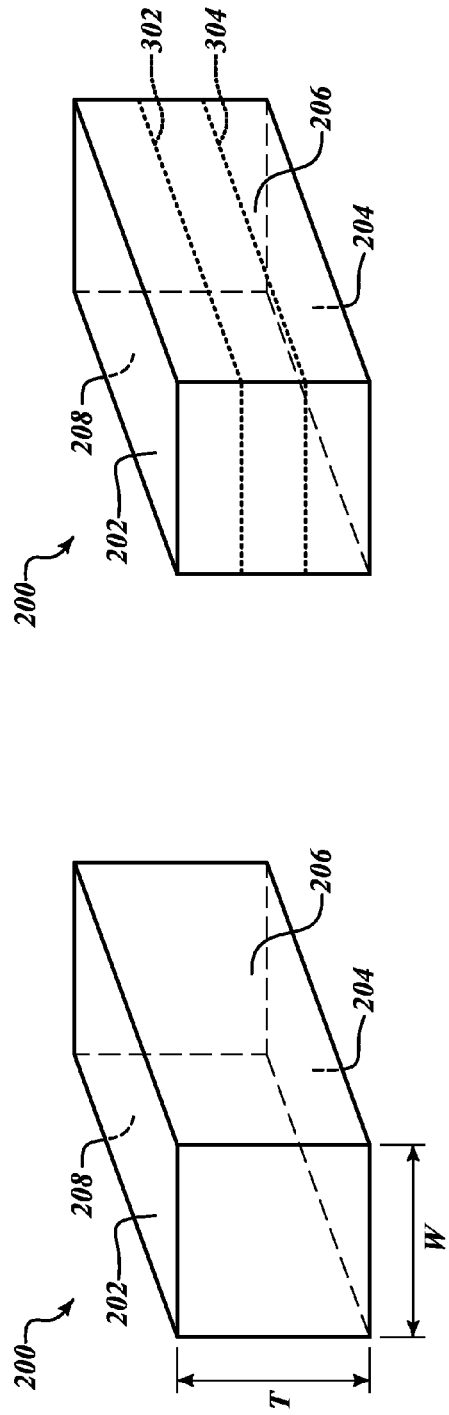
FIG.1 *(Prior Art)*
FIG.2 *(Prior Art)*
FIG.3 *(Prior Art)*

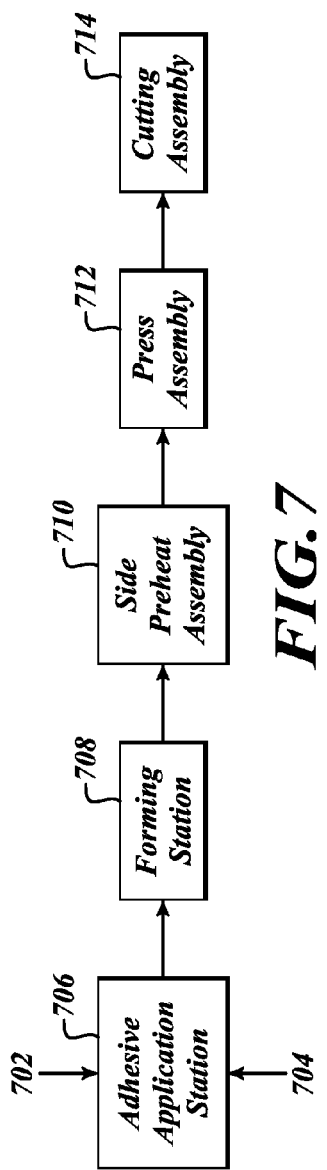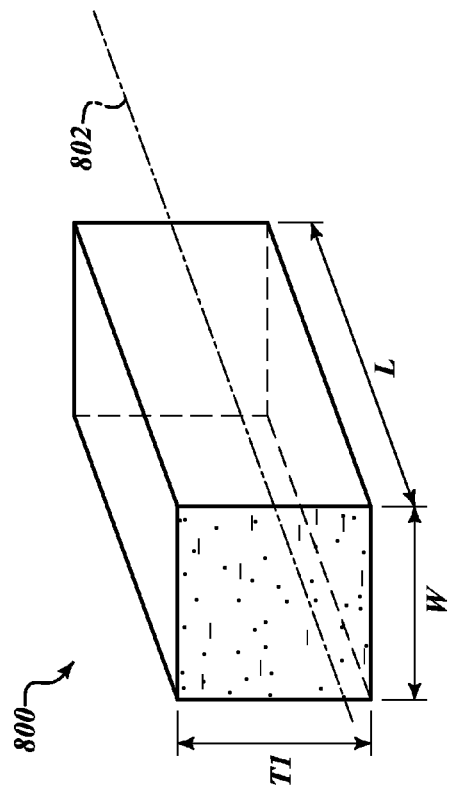

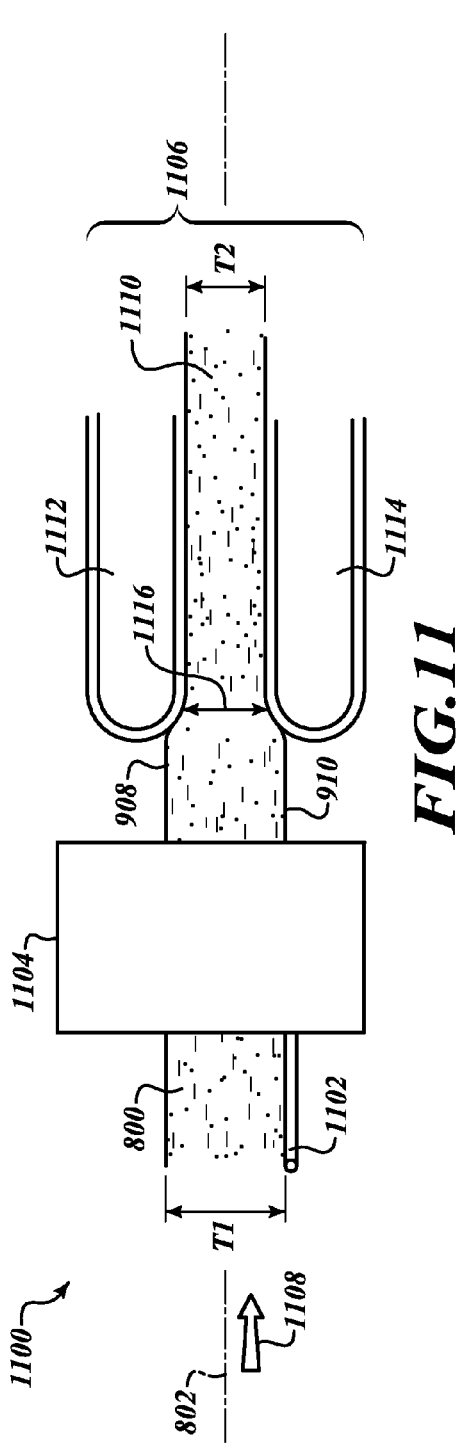
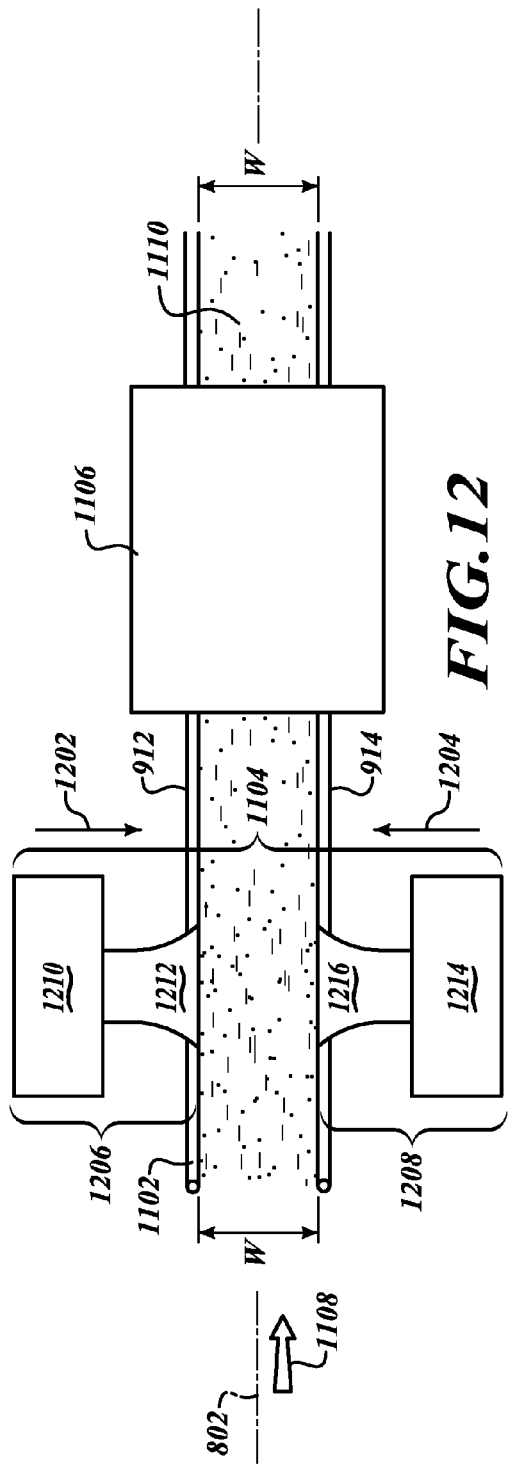

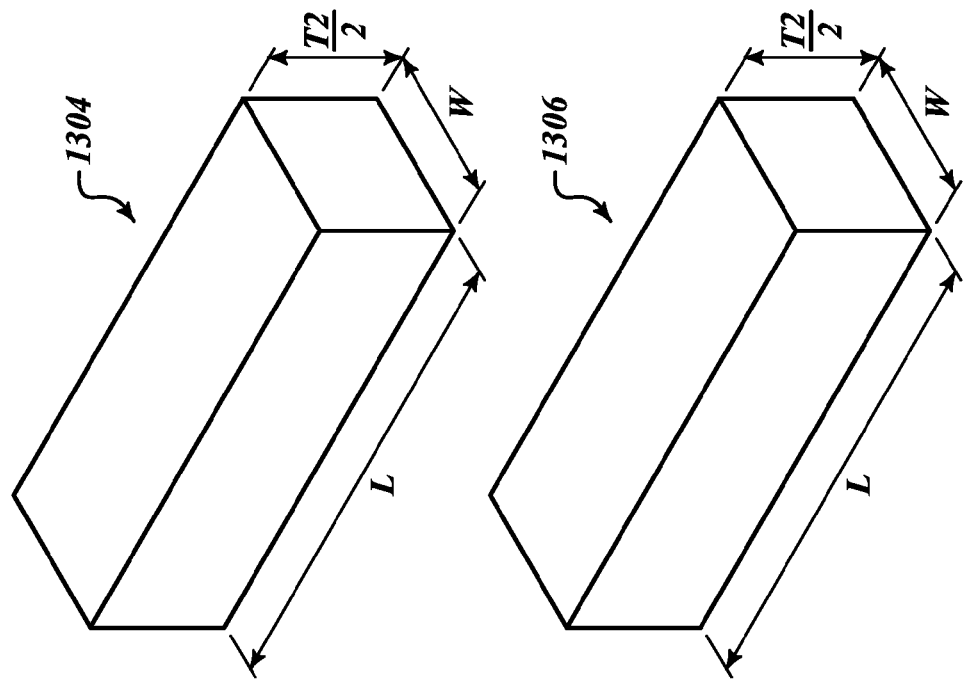
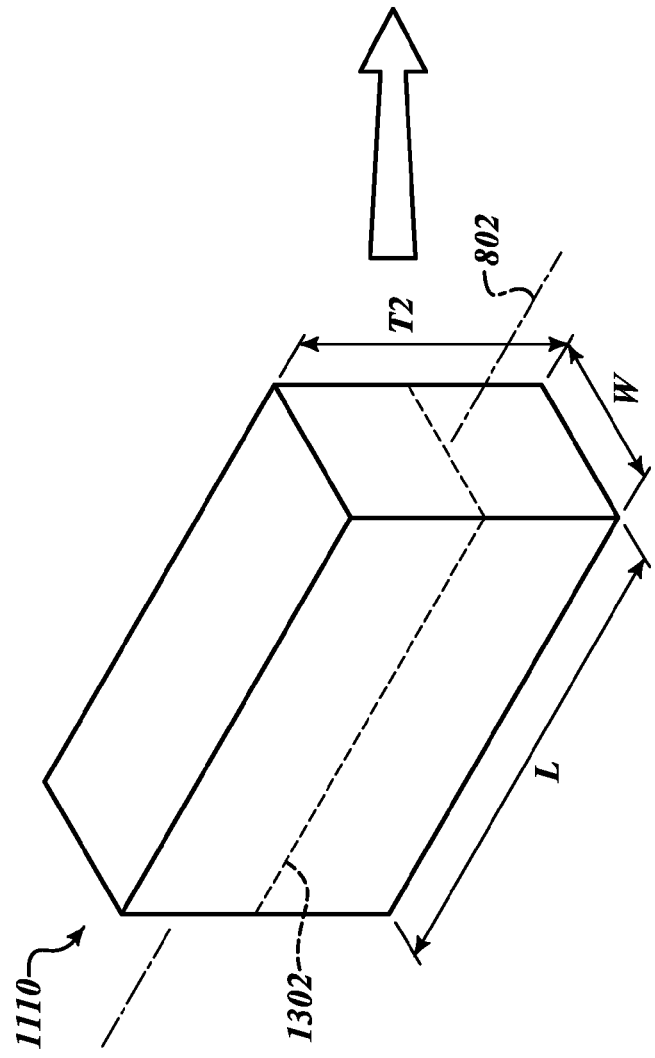
FIG.13

SYSTEMS AND METHODS FOR MANUFACTURING COMPOSITE WOOD PRODUCTS TO REDUCE BOWING

TECHNICAL FIELD

The present disclosure is directed generally to systems and methods for manufacturing composite wood products in order to reduce bowing and other undesirable effects from manufacturing stresses.

BACKGROUND

Composite wood products are manufactured by binding together wood elements (e.g., veneers, strands, flakes, chips, particles, fiber, solid pieces of wood, etc.) with suitable adhesives. Such products are typically used in construction applications as beams, headers, columns, joists, rafters, studs, or other structural components. To be suitable for this type of use, composite wood products should exhibit a certain degree of stiffness and dimensional stability.

Parallel strand lumber (PSL) is a high-strength composite wood product marketed under the name Parallam™ from iLevel by Weyerhaeuser Company. FIG. 1 is a schematic showing a conventional method for manufacturing PSL. Typically, wood elements (indicated by arrow 102) and an adhesive (indicated by arrow 104) are combined in an adhesive application station 106. The coated wood elements then enter a forming station 108 where they are laid up in a substantially parallel relationship to form a mat. The mat is consolidated in a press assembly 110 to form a billet 200 (shown in FIG. 2) having four faces: a top face 202, a bottom face 204, and two side faces 206 and 208. The thickness T of the billet 200 is substantially greater than its width W. Referring back to FIG. 1, the resulting billet is typically cut into two or three beams with a cutting assembly 112. FIG. 3 illustrates how the billet 200 may be cut into three beams along dotted lines 302 and 304 according to conventional methods.

In some applications, PSL produced according to methods described in FIG. 1 exhibit bulging on the top face 202 and the bottom face 204. Because the top and bottom faces of the billet are typically the coolest after exiting the press, they are more prone to blows and fissures. As a remedy, some PSL manufacturing companies have added a top/bottom preheat step to the PSL manufacturing process. As illustrated in FIG. 4, the mat is exposed to a top/bottom preheat assembly 402 prior to entering the press assembly. FIG. 5 shows an example of a top/bottom preheat assembly 402 for use with the method described in FIG. 4. A mat 502 is shown passing through a preheat assembly 402 and a press assembly 110. The preheat assembly 402 includes an upper wave guide 504 and a lower wave guide 506. Microwave energy represented by arrows 508 and 510 is delivered to the top and bottom of the mat before pressing.

In all conventional PSL manufacturing methods, the process of cutting the billet into beams releases stresses induced by the manufacturing process. As shown in FIG. 6, this can result in a beam 600 that is not completely straight. Beams manufactured according to conventional methods tend to exhibit bowing (indicated by reference character 602) and often revert to a shape similar to but less severe than the shape of the platen radius in the press. This shape is undesirable and can result in the product being unsuitable for use in a particular application due to its dimensional instability. Although the systems and methods shown in FIGS. 4 and 5 may be beneficial for reducing bulging, they have also been shown to exacerbate the problem associated with bowing in PSL beams. Bowing effects are well documented in PSL manufacturing and similar problems occur during the manufacturing other types of composite wood products.

Wood product manufacturing companies have taken numerous steps to reduce bowing and other defects associated with composite wood product manufacturing. One method involves modification of the shape of platen used in pressing operations. If the press infeed is reshaped to have a substantially larger radius, bowing effects can be mitigated. One drawback of this approach is that retrofitting presses can be extremely expensive. In addition, retrofitting is not possible in some facilities due to space constraints. Another method for mitigating bowing in PSL involves reducing the line speed for PSL manufacturing processes. Although this approach has been shown to reduce bowing to some extent, imposing line speed restrictions can ultimately lead to significant financial losses due to reductions in the amount of product that can be produced.

Accordingly, there is a need to develop new systems and methods for manufacturing PSL and other composite wood products to reduce and/or eliminate bowing and other undesirable effects from manufacturing stresses. Ideally, a process capable of reducing bow in PSL beams (when compared to conventional methods) without reducing throughput would be extremely useful in the composite wood products manufacturing industry.

SUMMARY

The following summary is provided for the benefit of the reader only and is not intended to limit in any way the invention as set forth by the claims. The present disclosure is directed generally towards systems and methods for manufacturing composite wood products in order to reduce bowing and other undesirable effects from manufacturing stresses.

In one embodiment, the disclosure includes a method for manufacturing a composite wood product. The method may include the steps of forming a mat from a plurality of wood elements and an adhesive, the mat having a width W measured substantially perpendicular to a longitudinal axis of the mat and an initial thickness T1. The mat is then moved in a machine direction, the machine direction being substantially parallel to the longitudinal axis and the temperature across the width W of the mat is adjusted. The mat is then compressed into a billet having a final thickness T2.

Further aspects are directed towards systems for manufacturing composite wood products. In some embodiments, the system includes a continuous movement mechanism, a side preheat assembly, and a press assembly. The continuous movement mechanism may be configured to move the mat in a machine direction, the machine direction being substantially parallel to the longitudinal axis.

The side preheat assembly may include one or more side energy generator assemblies configured to apply energy to one or more sides of the mat. The energy may be being applied in one or more horizontal directions, the horizontal directions being substantially perpendicular to the longitudinal axis of the mat. The press assembly may be configured to compress the mat to a billet having a final thickness T2.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIG. 1 is a flow chart schematically showing a first conventional method for manufacturing a composite wood product;

FIG. 2 is a perspective view of a billet produced according to conventional methods;

FIG. 3 is a perspective view of a billet being cut into one or more beams according to conventional methods;

FIG. 7 is a flow chart schematically showing methods for manufacturing composite wood products according to embodiments of the disclosure;

FIG. 8 is a perspective view of a mat formed according to embodiments of the disclosure;

FIG. 11 is a side view of a system for manufacturing a composite wood product according to embodiments of the disclosure;

FIG. 12 is a top view of a system for manufacturing a composite wood product according to embodiments of the disclosure;

FIG. 13 is a perspective view of a billet cut into two beams;

DETAILED DESCRIPTION

Figure 4:
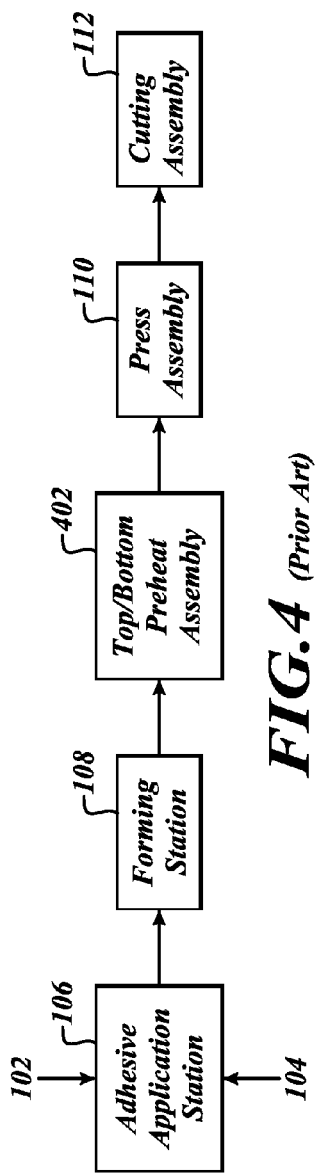
FIG. 4 is a flow chart schematically showing a second conventional method for manufacturing a composite wood product.
Figure 5:
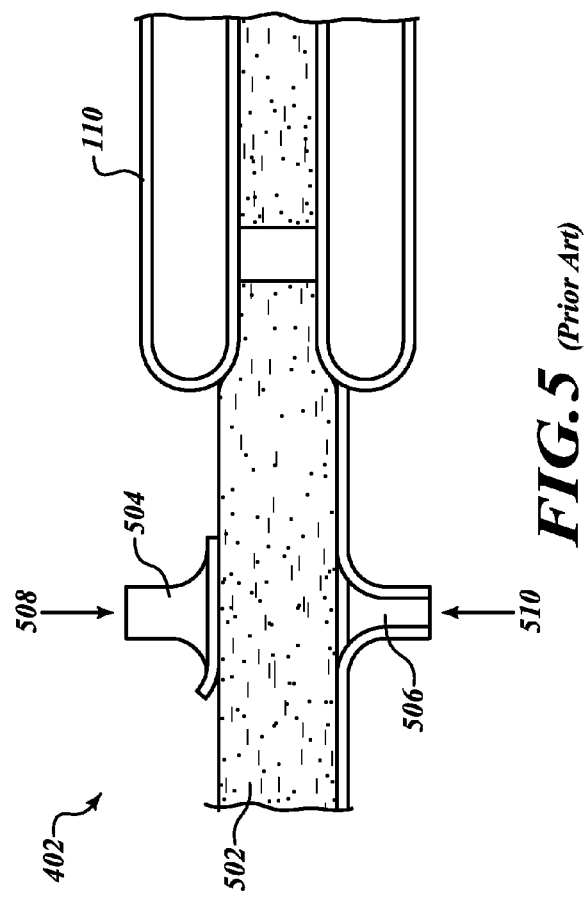
FIG. 5 is a side view of a conventional preheat assembly.
Figure 6:
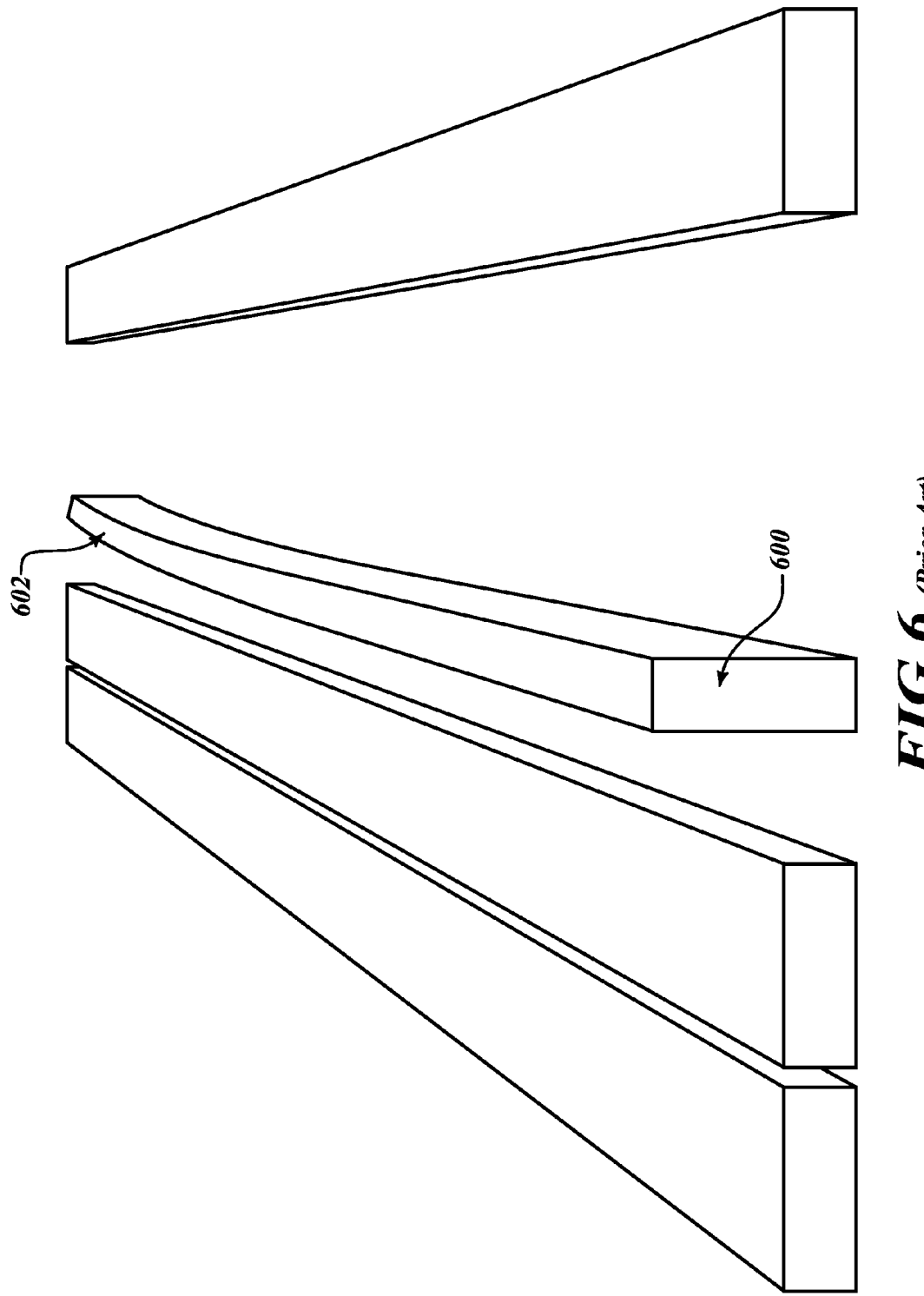
FIG. 6 is a perspective viewing of a composite wood product manufactured according to conventional methods, which exhibits bowing.

The present disclosure describes systems and methods for manufacturing composite wood products in order to reduce bowing and other undesirable effects from manufacturing stresses. Certain specific details are set forth in the following description and FIGS. 7-16 and 18-29 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "wood" is used to refer to any organic material produced from trees, shrubs, bushes, grasses or the like. The disclosure is not intended to be limited to a particular species or type of wood. The term "wood elements" is used to refer to discrete pieces derived from wood that are used to form a wood composite product. Wood elements in this disclosure include, but are not limited to veneers, strands, flakes, chips, particles, fiber, solid pieces of wood, or other similar materials. The term "composite wood product" is used to refer to a range of derivative wood products which are manufactured by binding together wood elements with adhesives. Examples of composite wood products include but are not limited to parallel strand lumber, oriented strand board, oriented strand lumber, and laminated strand lumber. Although many examples and descriptions in this disclosure refer to embodiments for manufacturing parallel strand lumber, the disclosure is intended to apply to a wide range of wood composite products.

Various terminology is used within the wood product manufacturing industry to refer to composite wood products in different stages of the manufacturing process. In this disclosure, the term "mat" is used to refer to a plurality of wood elements and an adhesive formed in a layup prior to consolidation or pressing. The term "billet" is used to describe the wood elements and adhesive after consolidation or pressing. The term "beam" is used to refer to one or more sections which have been cut from the billet after consolidation or pressing.

FIG. 7 is a flow chart schematically showing methods for manufacturing composite wood products according to embodiments of the disclosure. According to FIG. 7, a plurality of wood elements (indicated by arrow 702) and an adhesive (indicated by arrow 704) are combined in an adhesive application station 706. The coated wood elements then enter a forming station 708 where they are laid up in a substantially parallel relationship to form a mat. The mat is then treated in a side preheat assembly 710 and consolidated in a press assembly 712. After pressing, the resulting billet is typically cut into two or three beams with a cutting assembly 714. Systems and methods for resin application, lay up, and pressing are described in the following patent documents, all of which are hereby incorporated by reference: U.S. Pat. No. 4,020,311, U.S. Pat. No. 6,201,224, U.S. Pat. No. 7,048,825. Systems and methods according to the disclosure for the various steps in FIG. 7 will now be described in detail.

Referring to FIG. 8, the first step involved in manufacturing composite wood products according to the disclosure includes forming a mat 800 from a plurality of wood elements and an adhesive. The wood elements may be, for example, veneers, strands, flakes, chips, particles, fiber, solid pieces of wood, or other similar materials. Adhesives suitable for use with methods according to the disclosure include phenol formaldehyde resins, isocyanate resins, thermosetting resins, or other suitable binders known to a person of ordinary skill in the art. In some embodiments, the wood elements are arranged in a layup in a parallel relationship to one another. In some embodiments, the mat 800 has a width W measured substantially perpendicular to a longitudinal axis 802 of the mat 800, a length L, and an initial thickness T1. The thickness T1 may be substantially greater than the width W. Exemplary dimensions for embodiments according to the disclosure include a width W ranging from about 6 inches to about 48 inches, a length L ranging from about 20 feet to about 200 feet, and an initial thickness T1 ranging from about 6 inches to about 48 inches.

Figure 10:
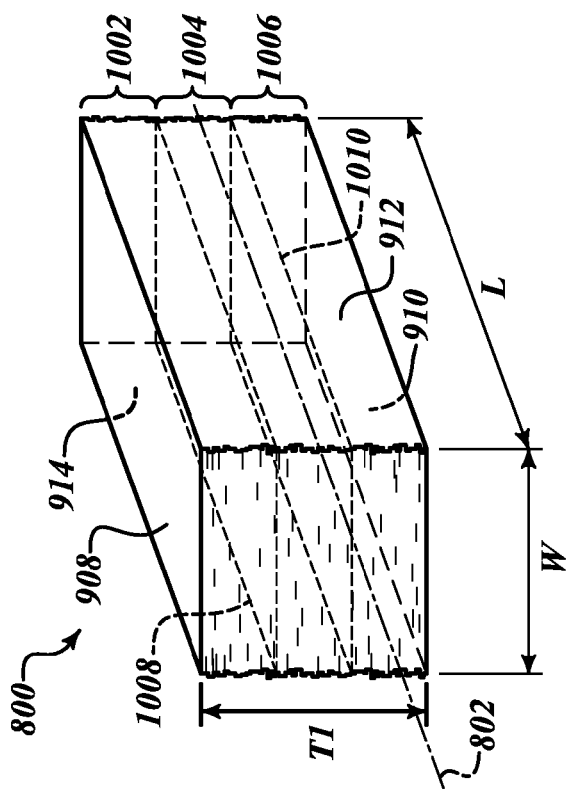
FIG. 10 is perspective view of a mat according to embodiments of the disclosure having two boundary planes.
Figure 9:
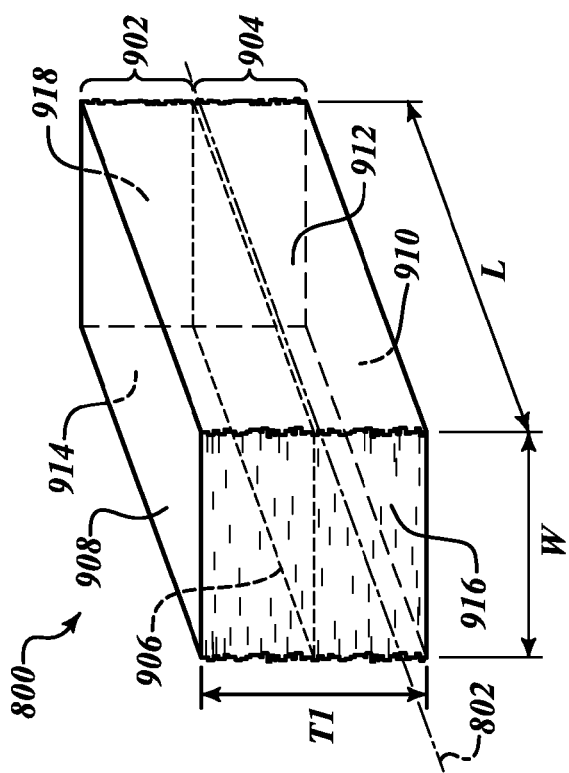
FIG. 9 is perspective view of a mat according to embodiments of the disclosure having one boundary plane.

In some embodiments, the mat 800 may be thought of as divided into two or more sections defined by one or more boundary planes. The one or more boundary planes may be substantially parallel to the longitudinal axis 802 of the mat 800. In FIG. 9, the mat 800 is shown divided into a first section 902 and a second section 904 defined by a first boundary plane 906. The mat has a top face 908, a bottom face 910, a first side face 912, a second side face 914, a front face 916, and a back face 918. In FIG. 10, the mat is shown divided into a first section 1002, a second section 1004, and a third section 1006. The first section 1002 and the second section 1004 are defined by the first boundary plane 1008. The second section 1004 and the third section 1006 are defined by a second boundary plane 1010. The boundary planes roughly correlate to the beams that will be cut from the mat 800 after it has been formed into a billet. A person of ordinary skill in the art will appreciate that composite wood products according to the disclosure may include any number of sections greater than two and any number of boundary planes greater than one.

In some embodiments, the next step in the process includes forming the mat 800 into a billet by substantially reducing the initial thickness T1 of the mat 800. In some embodiments, this may be accomplished using systems for manufacturing a composite wood product. Examples of such systems are shown in FIG. 11 (side view) and FIG. 12 (top view). Embodiments of the system 1100 include a continuous movement mechanism 1102, a side preheat assembly 1104, and a press assembly 1106.

Referring to FIG. 11 and FIG. 12, the mat 800 may be moved on the continuous movement mechanism 1102 in a machine direction indicated by arrow 1108. As shown in FIGS. 11 and 12, the machine direction 1108 is substantially parallel to the longitudinal axis 802. The continuous movement mechanism 1102 may be a conveyor belt or any other device for continuously moving an article in a manufacturing process known to a person of ordinary skill in the art.

According to some embodiments, the mat 800 is moved via the continuous movement mechanism 1102 through the side preheat assembly 1104. The side preheat assembly 1104 is configured to adjust the temperature across the width W of the mat 800. In some embodiments, temperature adjustment is accomplished by applying energy to the mat 800 in one or more horizontal directions shown by arrows 1202 and 1204 in FIG. 12. Accordingly, the energy is applied to the first side face 912 of the mat 800 and the second side face 914 of the mat 800 in one or more directions that are perpendicular to the longitudinal axis 802.

In some embodiments, the side preheat assembly 1104 includes one or more side energy generator assemblies. FIG. 12, for example, shows a first side energy generator assembly 1206 and a second side energy generator assembly 1208. Side energy generators suitable for use with embodiments of the disclosure may include microwave generator assemblies, hot air generator assemblies, steam generator assemblies, or any other suitable mechanism for adjusting the temperature across the width W of the mat 800. The number and overall arrangement of the side energy generator assemblies shown in the Figures is not intended to limit embodiments of the disclosure. A person of ordinary skill in the art will appreciate that although FIG. 12 shows two side energy generator assemblies, embodiments according to the disclosure may include a single side energy generator assembly or more than two side energy generator assemblies. Furthermore, side energy generator assemblies according to embodiments of the disclosure may be arranged in different configurations or arrangements other than those explicitly shown.

Microwave energy may be employed as the energy generating mechanism for the side preheat assembly 1104 according to embodiments of the disclosure. In the embodiment depicted in FIG. 12, the first side energy generator assembly 1206 includes a first microwave generator 1210 and a first microwave window 1212. The first side energy generator assembly 1206 is positioned adjacent to the first side face 912 of the mat 800 and is configured to direct microwave energy (in a horizontal direction shown by the arrow 1202) from the first microwave generator 1210 through the first microwave window 1212 and into the mat 800 as it passes through a zone in which it is either not compressed at all or is lightly compressed prior to entering the press assembly 1106. The second side energy generator assembly 1208 includes a second microwave generator 1214 and a second microwave window 1216. The second side energy generator assembly 1208 is positioned adjacent to the second side face 914 of the mat 800 and is configured to direct microwave energy (in a horizontal direction shown by the arrow 1204) from the second microwave generator 1214 through the second microwave window 1216 and into the mat 800.

Microwave generators according to embodiments of the disclosure may be configured to produce microwave energy at a frequency ranging from about 200 MHz to about 10 GHz. Microwave generators according to embodiments of the disclosure may be magnetrons having a power output of about 1 kW to about 500 kW. Alternatively in some embodiments, klystron, or other microwave generators known to a person of ordinary skill in the art may be used. Microwave windows according to embodiments of the disclosure may be constructed from ceramics, Teflon, glass, or any combination of similar materials.

After the mat 800 is preheated, it is passed through the press assembly 1106 where it is compressed into a billet 1110. Continuous belt-type presses suitable for use with embodiments of the disclosure are well known in the art and not described in detail. Referring back to FIG. 11, the press assembly 1106 may include a first press section 1112 and a second press section 1114, which are spaced apart to form a press passage 1116 through which the mat 800 may be passed. Some embodiments of press assemblies 1106 according to the disclosure may also include an in-press microwave heating mechanism such as those described in U.S. Pat. No. 7,070,676, which is hereby incorporated by reference. As the mat is moved through the press assembly 1106, the first press section 1112 and the second press section 1114 compress the mat 800 into a billet 1110 having a final thickness T2. In some embodiments, the length L and width W of the mat 800 do not substantially change. In embodiments according to the disclosure, the initial thickness T1 may range from about 1 foot to about 6 feet and the final thickness T2 may range from about 1 inch to about 2 feet.

Figure 14:
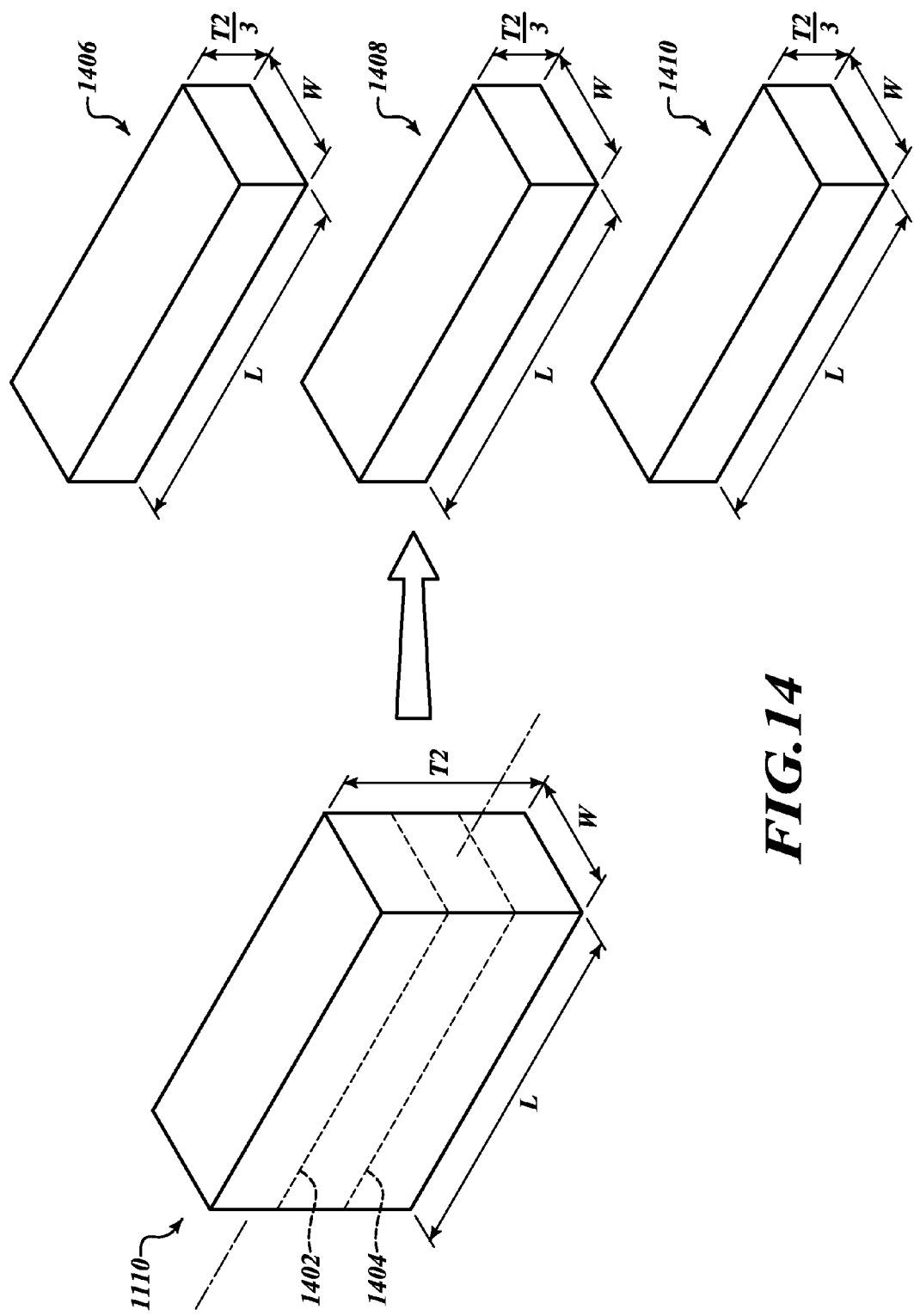
FIG. 14 is a perspective view of a billet cut into three beams.

After the billet 1110 is formed, it is moved through a cutting assembly to be cut into beams for commercial sale. Cutting assemblies suitable for use with embodiments of the disclosure are well known in the art and are therefore not described in detail. Referring to FIGS. 13 and 14, the billet 1110 is shown being cut into two and three beams respectively. In FIG. 13, the billet 1110 may be cut along a cutting plane 1302 that is substantially parallel with the length L of the billet into two beams: a first beam 1302 and a second beam 1304. The cutting plane 1302 may be located at substantially the same position as first boundary plane 906 from FIG. 9 or may be located at a slightly different position on the mat 800. The first beam 1302 and the second beam each have a thickness T2/2 which is substantially equal to half of the final thickness T2. In embodiments according to the disclosure, the T2/2 may be approximately 5 inches.

Referring to FIG. 14, the billet 1110 may be cut along a first cutting plane 1402 and a second cutting plane 1404 into three beams: a first beam 1406, a second beam 1408, and a third beam 1410. The first cutting plane 1402 may be located at substantially the same position as the first boundary plane 1008 from FIG. 10 or may be located at a slightly different position on the mat 800. Likewise the locations of the second cutting plane 1404 may also correlate to the location of the second boundary plane 1010. The first beam 1406, the second beam 1408, and the third beam 1410 each have a thickness T2/3 which is substantially equal to one third of the final thickness T2. In embodiments according to the disclosure, the T2/3 may be approximately 3 inches.

A person of ordinary skill in the art will appreciate that billets made using systems and methods according to the disclosure may be cut into any number of beams greater than one. For example, a billet may be cut into two, three, four, five, or more beams. Accordingly, billets may have varying dimensions, thereby yielding beams of varying widths, thicknesses, and lengths. Systems and methods according to the disclosure may be effective to reduce bowing in beams cut from billets by preheating a well defined area of the mat prior to compression. The details of systems methods for preheating according to embodiments of the disclosure will now be described in further detail. Although such methods are described with respect to microwave energy systems, a person of ordinary skill in the art will understand that the same principles may be applied to other mechanism for generating energy suitable for adjusting temperature in a composite wood product.

Figure 15:
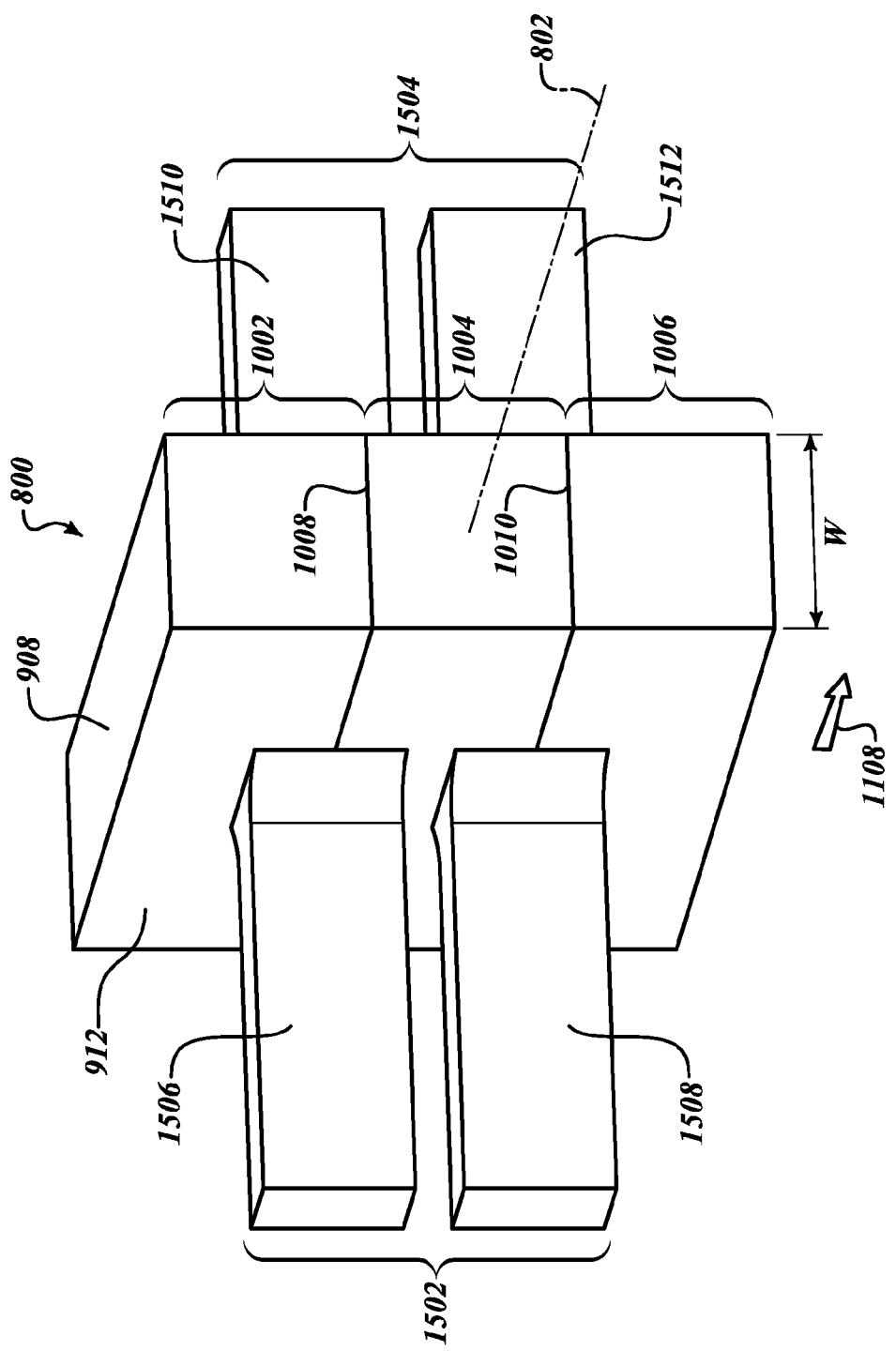
FIG. 15 is a perspective view of a side preheat assembly according to embodiments of the disclosure.

FIG. 15 is a perspective view of the mat 800 moving through a side preheat assembly according to embodiments of the disclosure. In FIG. 15, the mat 800 is shown divided by a first boundary plane 1008 and a second boundary plane 1010 as initially presented in FIG. 10. As shown, the boundary planes are substantially parallel to the top face 908 of the mat 800. The longitudinal axis 802 is oriented in a direction pointing out of the page. As the mat 800 moves in the machine direction 1108, it passes by a side preheat assembly including: a first side energy generator assembly 1502 and a second side energy generator assembly 1504. In the embodiment shown in FIG. 15, the first side energy generator assembly 1502 includes a first microwave window 1506 and a second microwave window 1508. The second side energy generator assembly 1504 includes a third microwave window 1510 and a fourth microwave window 1512. Each microwave window is connected to one or more microwave generators (not shown) so that microwave energy may be applied to the mat 800.

In embodiments according to the disclosure, the first microwave window 1506 and the third microwave window 1510 are positioned adjacent to the first boundary plane 1008. Likewise, the second microwave window 1508 and the fourth microwave window 1512 are positioned adjacent to the second boundary plane 1010. Referring back to FIG. 14, the locations of the boundary planes are determined by estimating the locations of the cutting planes 1402 and 1404. Accordingly, some embodiments of the disclosure endeavor to heat the portion of the mat 800 that will become the top and/or bottom face of the first beam 1406, the second beam 1408, and/or the third beam 1410 after formation into a billet and cutting. The heating pattern from side preheat systems and methods according to embodiments of the disclosure is expected to minimize bowing by focusing heat on the bottom of the first beam 1406 (pulling it downward), at the top and bottom of the second beam 1408, and at the top of the third beam 1410 (pulling it upward). Preheating according to embodiments of the disclosure may induce a lengthening of wood elements opposite to the top/bottom pre-heat and consequently creating cupping in the beam that will counterbalance the cupping induced by the pressing geometry. In some embodiments, this may be effective to ensure there is a straightening effect from the induced thermal elongation before pressure is applied to the mat 800 in the press assembly 1106.

Figure 16:
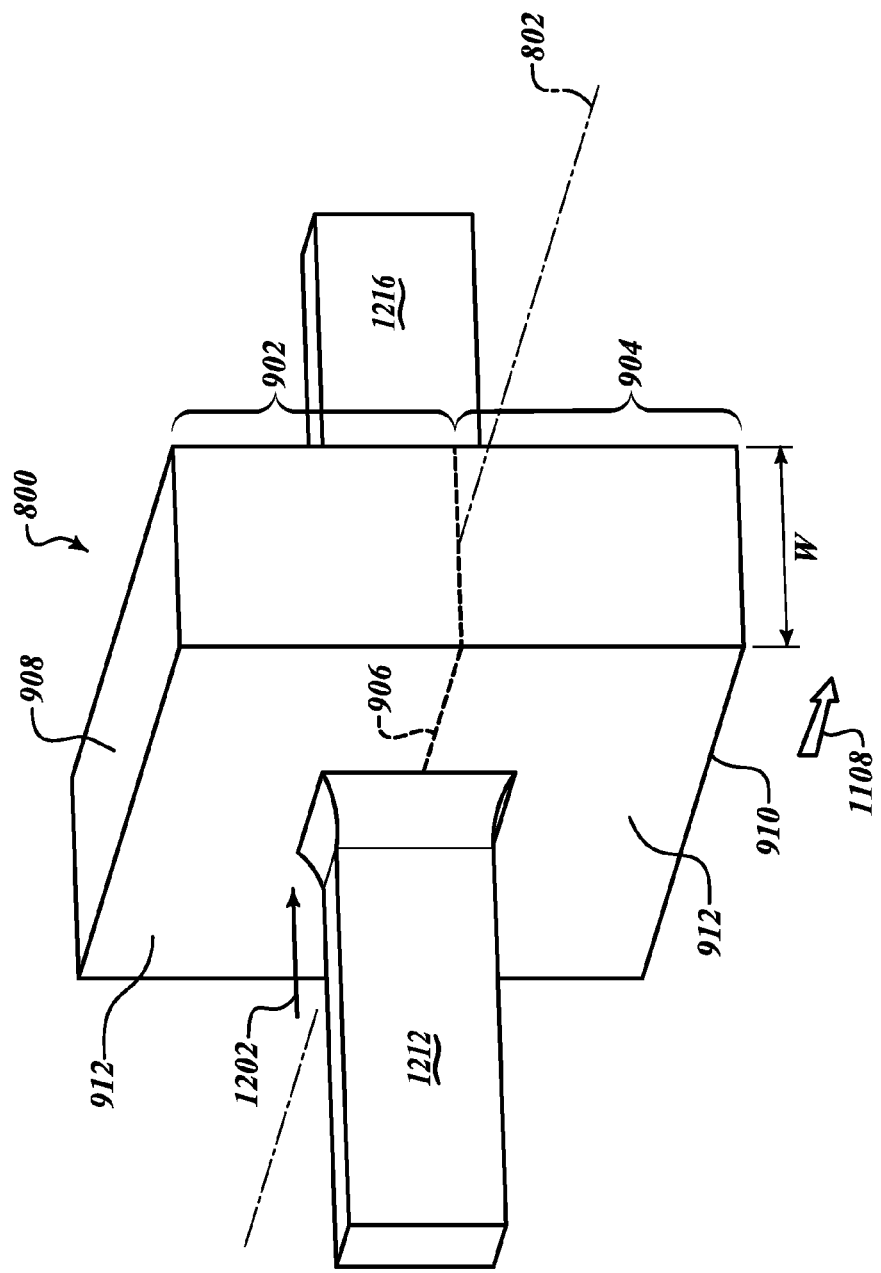
FIG. 16 is a perspective view of another side preheat assembly according to embodiments of the disclosure.

FIG. 16 is a perspective view of the mat 800 moving through a side preheat assembly according to embodiments of the disclosure. In contrast to FIG. 15, which depicted an embodiment of a side preheat assembly comprising a total of four microwave windows, the embodiment shown in FIG. 16 comprises two microwave windows: a first microwave window 1212 and a second microwave window 1214. In FIG. 16, the mat 800 is shown divided by the boundary plane 906 initially presented in FIG. 9, the boundary plane 906 being substantially parallel to the top face 908 of the mat 800. Referring back to FIG. 13, positioning of the first microwave window 1212 and positioning of the second microwave window 1216 may be determined by estimating the locations of the cutting plane 1302. Accordingly, some embodiments of the disclosure endeavor to heat the portion of the mat 800 that will become the top and/or bottom face of the first beam 1304 and the second beam 1306 after formation into a billet and cutting.

Embodiments of the disclosure are envisioned to encompass arrangements of side preheat assemblies other than those explicitly shown in FIGS. 15 and 16. Based on the application, any number of boundary planes may be used to divide the mat 800 into any number of sections. Accordingly, many different numbers and configurations of microwave windows may be used.

Figure 17:
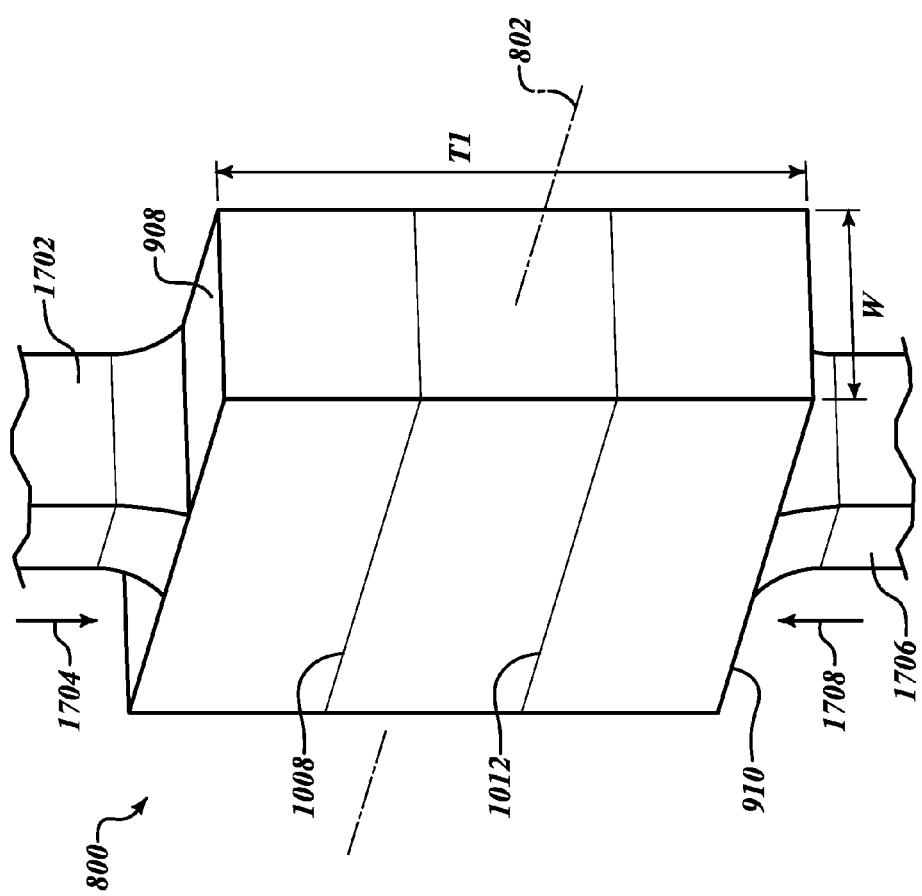
FIG. 17 is a perspective view of a conventional top/bottom preheat assembly.
Figure 18:
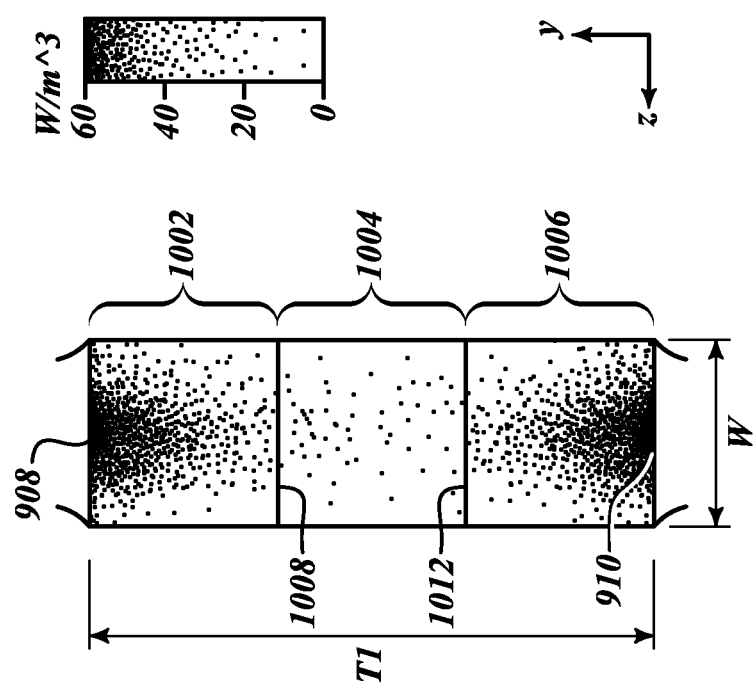
FIG. 18 is a diagram depicting the heating pattern for the top/bottom preheat assembly in FIG. 17.
Figure 19:
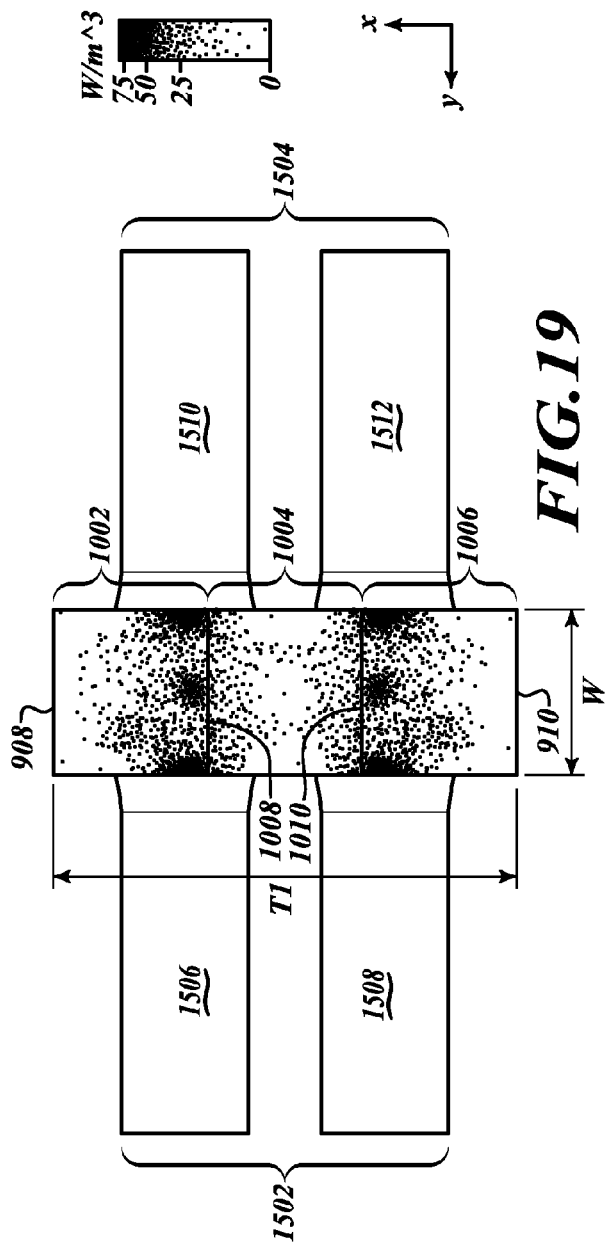
FIG. 19 is a diagram depicting the expected heating pattern for the side preheat assembly in FIG. 15.

FIGS. 17-19 illustrate expected heating patterns for embodiments of the disclosure compared with heating patterns from conventional top/bottom preheat assemblies. FIG. 17 is a perspective view of a conventional top/bottom preheat assembly. In FIG. 17, the mat 800 is shown divided by a first boundary plane 1008 and a second boundary plane 1010 into a first section 1002, a second section 1004, and a third section 1006 (see FIG. 10). The mat modeled has a width W of approximately 12.5 inches and an initial thickness T1 of approximately 36 inches. A top/bottom preheat assembly is positioned adjacent to the top face 908 and the bottom face 910 of the mat 800. The top/bottom preheat assembly includes a first microwave window 1702 configured to apply energy in a first direction indicated by arrow 1704 and a second microwave window 1706 configured to apply energy in a second direction indicated by arrow 1708. In this example, both windows are configured to apply microwave energy having a frequency of about 915 MHz.

FIG. 18 is a diagram depicting the heating pattern for the top/bottom preheat assembly in FIG. 17. The heating pattern (measured in Watts per cubic meter) indicates hot spots near the top face 908 and the bottom face 910. Accordingly, if the mat is cut into three beams, the beam made from the first section 1002 and the beam made from the third section 1006 may be expected to exhibit bowing.

FIG. 19 is a diagram depicting the expected heating pattern for side preheating assemblies according to embodiments of the disclosure. The heating pattern in FIG. 19 was created based on a mat having the same dimensions as the mat modeled in FIG. 18. In FIG. 19, the model is based on the mat passing through the side preheating assembly from FIG. 15. The diagram in FIG. 19 indicates a heating pattern that is substantially symmetrical about each of the boundary planes 1008 and 1010. Accordingly, if the mat is cut into three beams, the energy supplied by the side preheat assembly is expected to help remediate bowing in beams cut from the first section 1002 and the third section 1006. Preheating according to embodiments of the disclosure is expected to be effective to counterbalance any bowing in the beam cut from the second section 1004.

Figure 20:
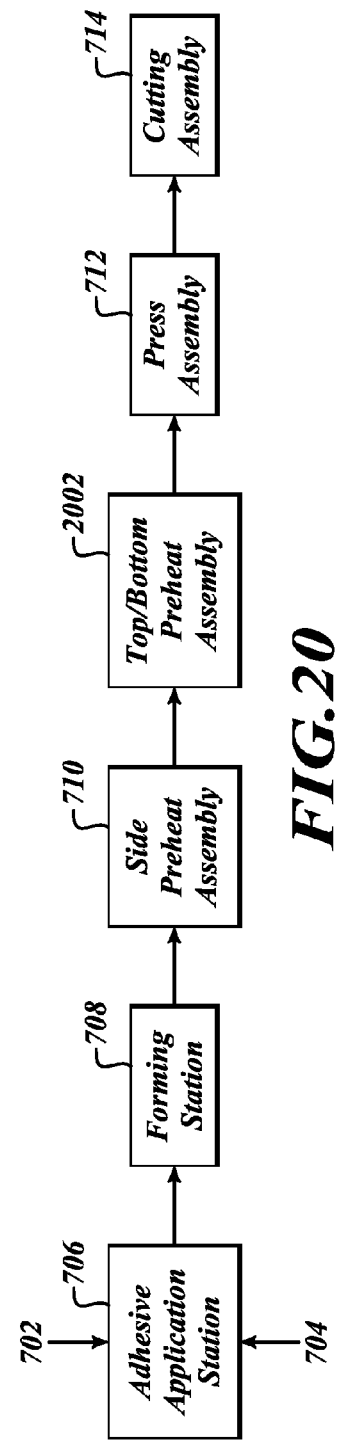
FIGS. 20-22 are flow charts schematically showing methods for manufacturing composite wood products according to embodiments of the disclosure.
Figure 21:
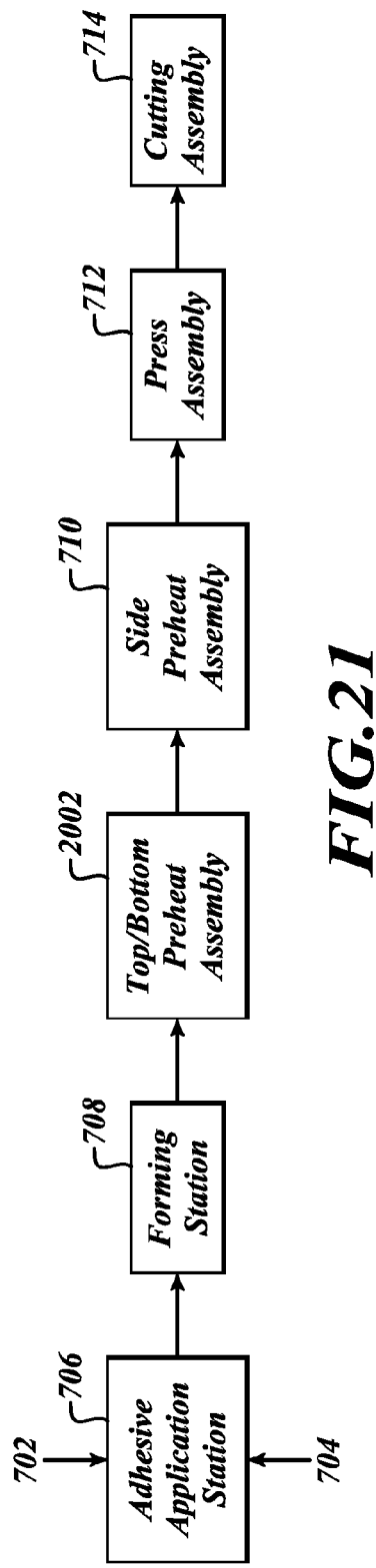
Figure 22:
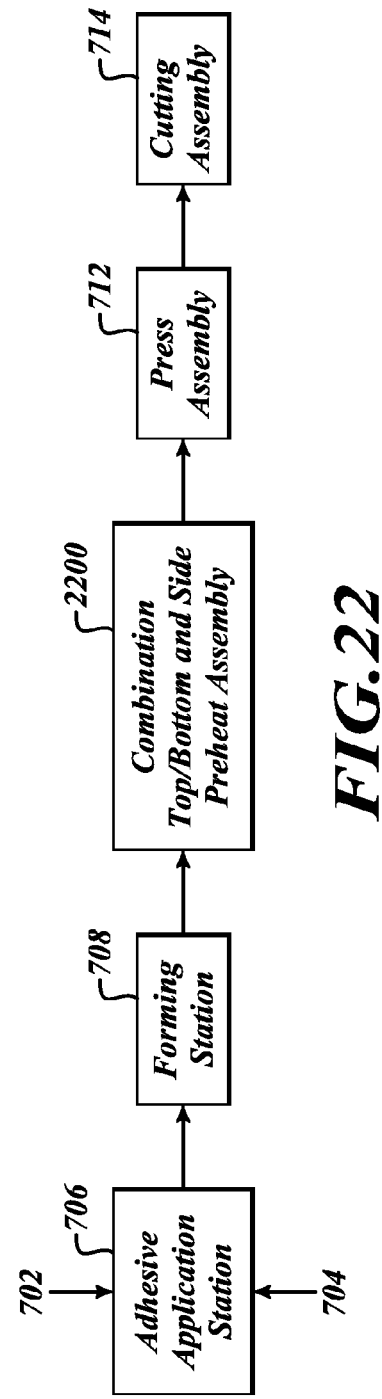

In some embodiments, the disclosure contemplates using top/bottom preheat systems and methods in combination with the side preheat systems and methods discussed above. This type of arrangement may be effective to provide symmetric heat to the middle beam (see e.g., second beam 1408 in FIG. 14) thereby reducing bowing. FIGS. 20-22 are flow charts schematically showing methods for manufacturing composite wood products according to embodiments of the disclosure. According to FIG. 20, a plurality of wood elements 702 and an adhesive 704 are combined in an adhesive application station 706. The coated wood elements then enter a forming station 708 where they are laid up in a substantially parallel relationship to form a mat. The mat is then treated in a side preheat assembly 710 and a top/bottom preheat assembly 2002 before it is consolidated in a press assembly 712 and cut by a cutting assembly 714. As shown in FIG. 21, in some embodiments, top/bottom preheating may be performed before side preheating. Alternatively, a combination top/bottom and side preheat assembly may be used to apply microwave energy to the top, bottom, and side faces of the mat simultaneously.

Figure 23:
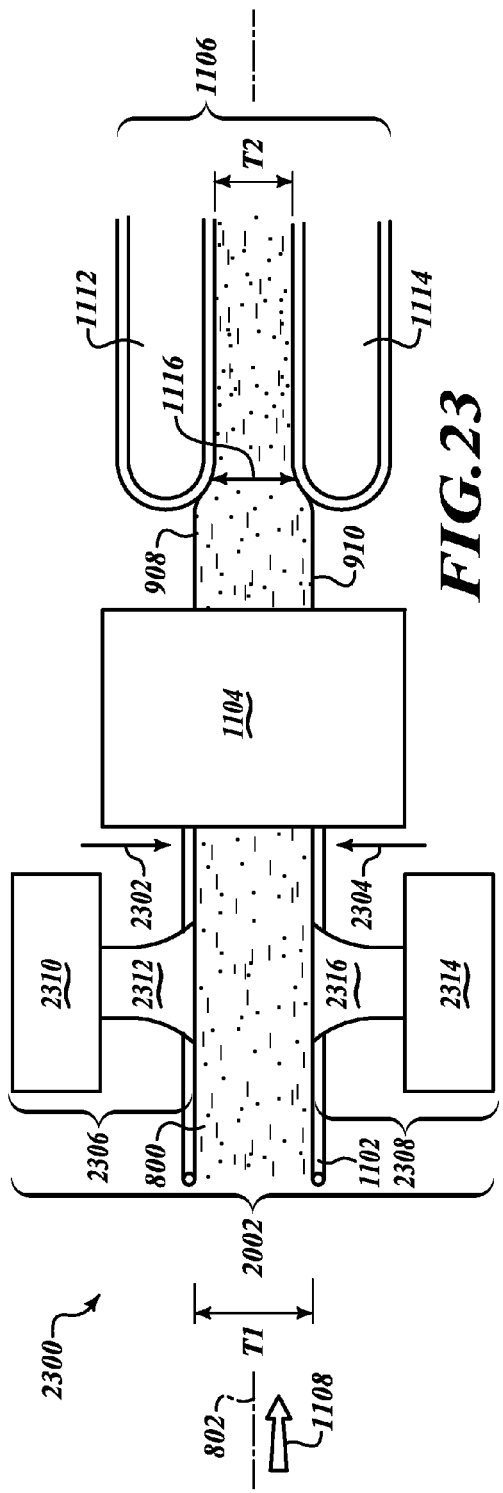
FIG. 23 is a side view of a system for manufacturing a composite wood product according to embodiments of the disclosure.
Figure 24:
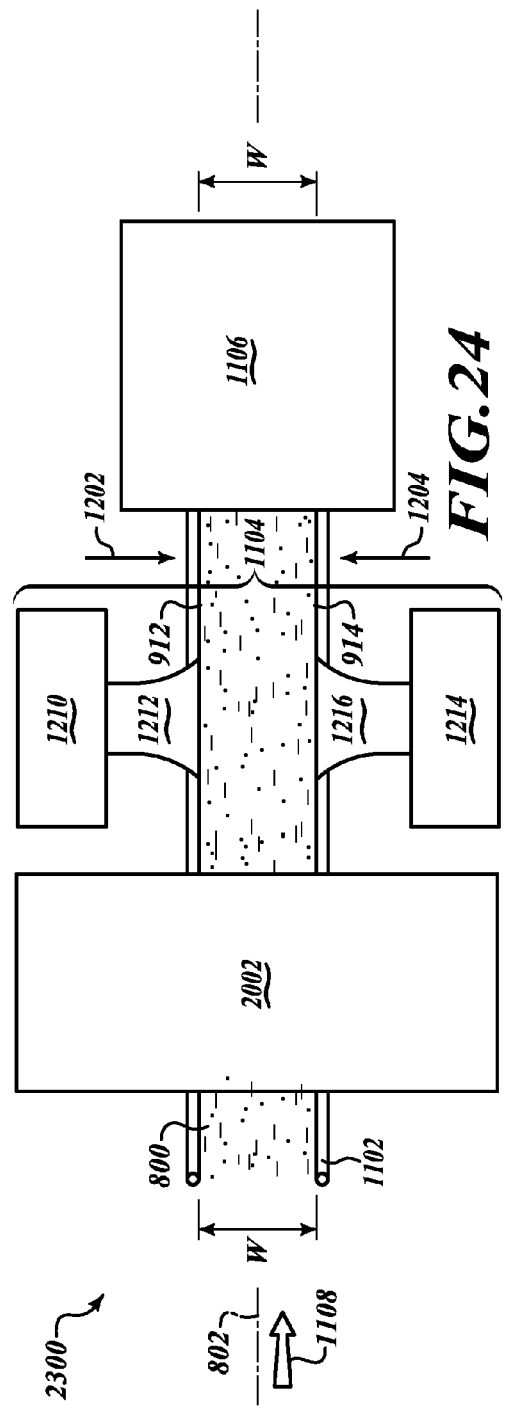
FIG. 24 is a top view of a system for manufacturing a composite wood product according to embodiments of the disclosure.

Examples of systems according to the disclosure that incorporate top/bottom preheating are shown in FIG. 23 (side view) and FIG. 24 (top view). Embodiments of the system 2300 include a continuous movement mechanism 1102, a top/bottom preheat assembly 2102, a side preheat assembly 1104, and a press assembly 1106. The continuous movement mechanism 1102, side preheat assembly 1104, and press assembly 1106 may incorporate substantially the same components as the system described in FIGS. 11 and 12. The top/bottom preheat assembly 1104 is configured to adjust the temperature across the thickness T1 of the mat 800. In some embodiments, temperature adjustment is accomplished by applying energy to the mat 800 in one or more vertical directions shown by arrows 2302 and 2304 in FIG. 23. Accordingly, the energy is applied to the top face 908 of the mat 800 and the bottom face 910 of the mat.

In some embodiments, the top/bottom preheat assembly 2002 includes one or more top/bottom energy generator assemblies. FIG. 23, for example, shows a top energy generator assembly 2306 and a bottom energy generator assembly 2308. Energy generators suitable for use with embodiments of the disclosure may include microwave generator assemblies, hot air generator assemblies, steam generator assemblies, or any other suitable mechanism for adjusting the temperature across the thickness T1 of the mat 800. The number and overall arrangement of the top/bottom energy generator assemblies shown in the Figures is not intended to limit embodiments of the disclosure. A person of ordinary skill in the art will appreciate that although FIG. 23 shows two top/bottom energy generator assemblies (e.g., a top and a bottom), embodiments according to the disclosure may include a single top energy generator assembly, a single bottom energy generator assembly, or more than two top/bottom energy generator assemblies. Furthermore, top/bottom energy generator assemblies according to embodiments of the disclosure may be arranged in different configurations or arrangements than explicitly shown.

Microwave energy may be employed as part of the top/bottom preheat assembly 2002 according to embodiments of the disclosure. In the embodiment depicted in FIG. 23, the top energy generator assembly 2306 includes a first microwave generator 2310 and a first microwave window 2312. The top energy generator assembly 2306 is positioned adjacent to the top face 908 of the mat 800 and is configured to direct microwave energy (in a vertical direction shown by the arrow 2302) from the first microwave generator 2310 through the first microwave window 2312 and into the mat 800. The bottom energy generator assembly 2308 includes a second microwave generator 2314 and a second microwave window 2316. The bottom energy generator assembly 2308 is positioned adjacent to the bottom face 910 of the mat 800 and is configured to direct microwave energy (in a vertical direction shown by the arrow 2304) from the second microwave generator 2314 through the second microwave window 2316 and into the mat 800.

From the foregoing, it will be appreciated that the specific embodiments of the disclosure have been described herein for purposes of illustration, but that various modifications may be made without deviating from the disclosure. For example, the configuration and number of preheat assemblies shown in the Figures may be modified without departing from the spirit of the disclosure. Additionally systems and methods according to the disclosure may be used to manufacture wood products other than those explicitly described.

Aspects of the disclosure described in the context of particular embodiments may be combined or eliminated in other embodiments. For example, aspects of the disclosure described with respect to embodiments involving two beams may be applied to embodiments involving more than two beams. Features described with respect to embodiments involving microwave energy generators may also be applied to embodiments utilizing other types of energy generation.

Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

The following examples will serve to illustrate aspects of the present disclosure. The examples are intended only as a means of illustration and should not be construed to limit the scope of the disclosure in any way. Those skilled in the art will recognize many variations that may be made without departing from the spirit of the disclosure.

Example 1

Deflection in Composite Wood Products Made Using Conventional Methods and Methods According to Embodiments of the Disclosure In a comparative experiment, beams of composite wood products were produced using conventional methods and systems and methods according to embodiments of the disclosure. Three groups of billets were produced in order to evaluate bowing in the resultant beams. The first group (the control group) was produced using conventional systems and methods. The second and third groups were produced using systems and methods according to embodiments of the disclosure.

Figure 25:
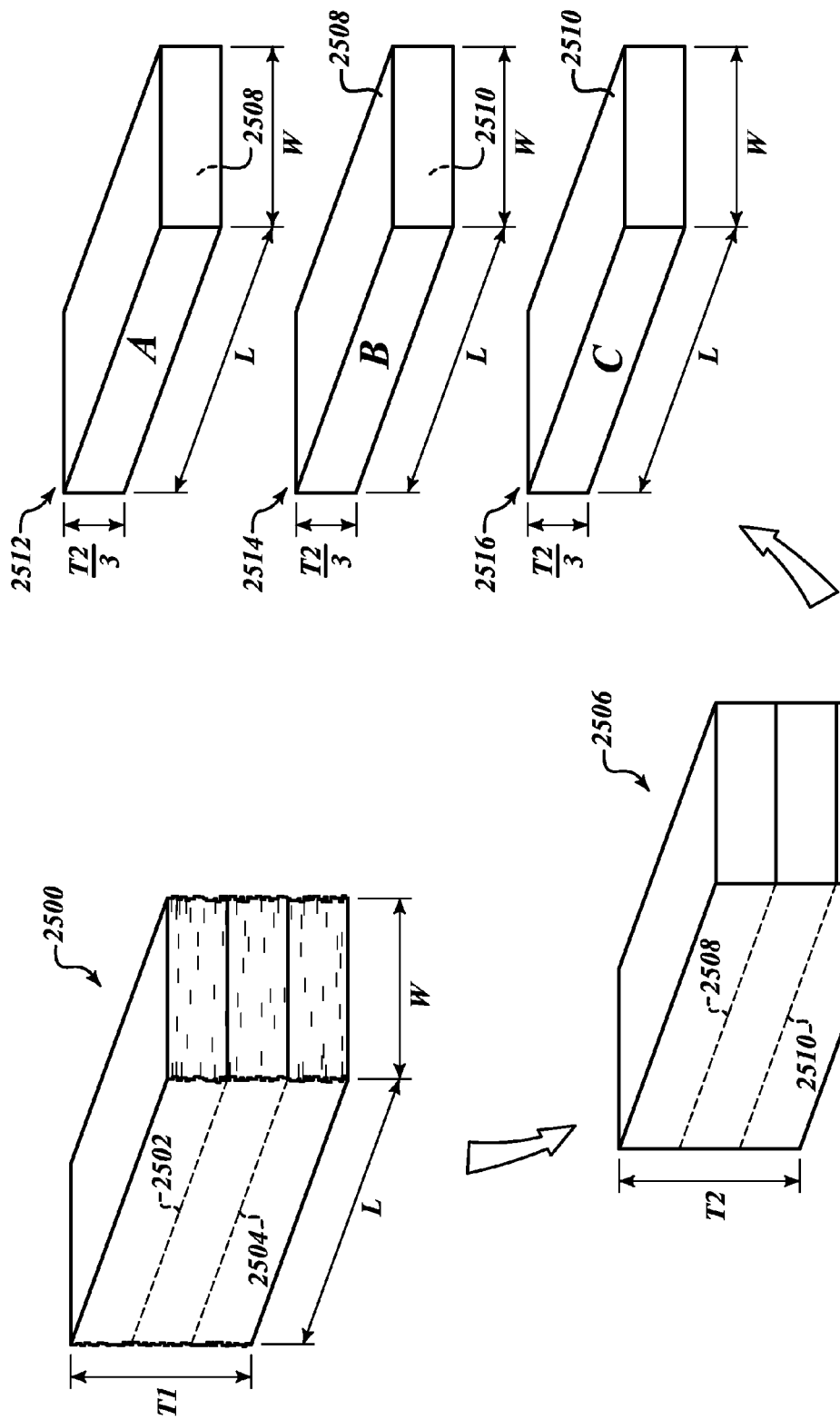
FIG. 25 is a schematic showing how billets were cut into beams in a comparative experiment.

The beams in each of the three groups were produced from mats made from wood elements and an adhesive (shown schematically in FIG. 25 by reference character 2500). The wood elements were strands made from a mix of yellow pine and poplar. The adhesive was a phenoyl formaldehyde resin. The mats were laid up using conventional methods. Each mat had a length L of approximately 48 feet, a width W of about 12 inches, and an initial thickness T1 of about 36 inches.

After mat formation, the mats in the first group were pressed into billets without being subjected to any preheating treatment. FIG. 1 schematically shows the process used to manufacture the first group. The line speed for the first group was approximately 7 feet per minute.

As described above, the mats in the second and third groups were subjected to preheating according to embodiments of the disclosure. The second group was produced using systems and methods according to the disclosure such as those shown in FIGS. 7 and 15. Four 15 kW microwave windows (having a total power of 60 kW) were used to apply side preheating microwave energy at a frequency of approximately 915 MHz. The microwave windows were positioned adjacent to the boundary planes 2502 and 2504. The line speed for the second billet group was approximately 7 feet per minute.

The third group was produced using systems and methods according to the disclosure such as those shown in FIGS. 7 and 15. Four 30 kW microwave windows (having a total power of 120 kW) were used to apply side preheating microwave energy at a frequency of approximately 915 MHz. The microwave windows were positioned adjacent to the boundary planes 2502 and 2504. The line speed for the second billet group was approximately 7 feet per minute.

After pressing each mat 2500 into a billet 2506 having a final thickness T2 of approximately 11.1 inches, each billet 2506 was cut along cutting planes 2508 and 2510 into three equally sized beams: beam A (reference character 2512), beam B (reference character 2514), and beam C (reference character 2516). Accordingly, each group consisted of 15 beams, each having a thickness of approximately 3.5 inches.

Figure 26:
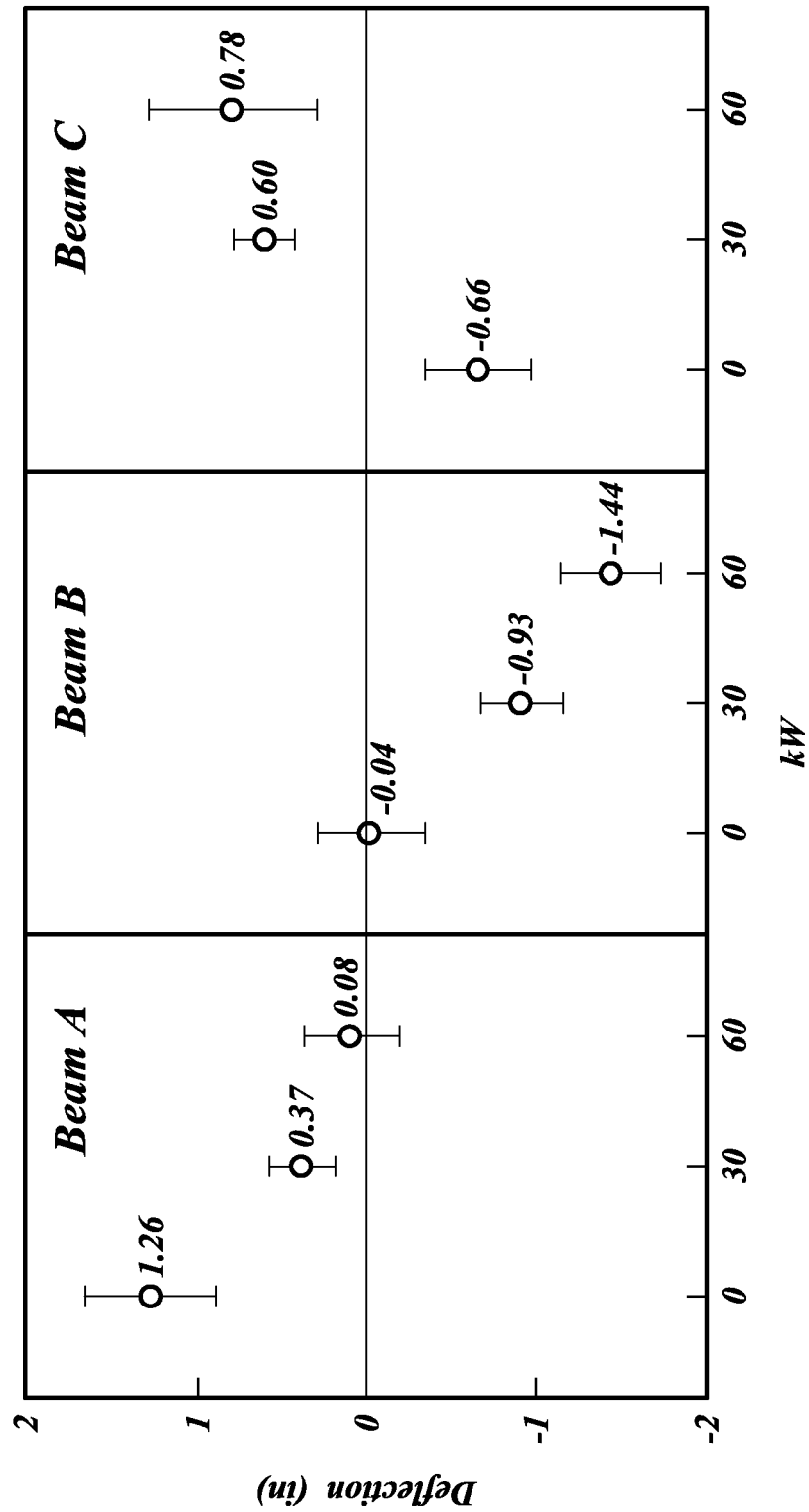
FIG. 26 is a plot showing deflection of beams made according to conventional methods compared to beams made using systems and methods according to the disclosure.

After each billet was cut into three beams, deflection (in inches) was measured over the length of each beam. Deflection was measured using laser scanning and manual techniques that are well known to a person of ordinary skill in the art. FIG. 26 is a plot showing average deflection of beam A, beam B, and beam C in each of the three groups. As demonstrated, systems and methods according to the disclosure may be able to reduce bowing effects in beam A and beam C when compared to conventional methods.

Example 2

Figure 28:
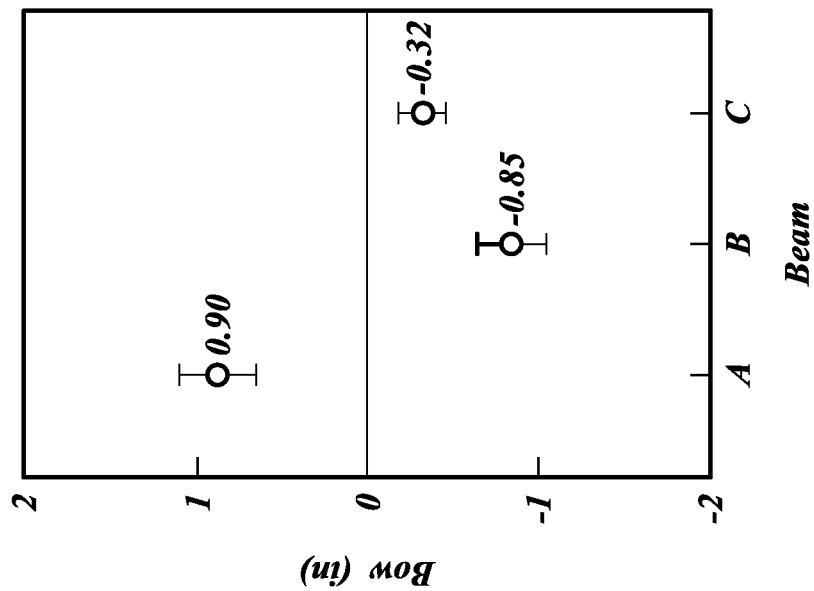
FIGS. 27 and 28 are a plots showing deflection of beams made using systems and methods according to the disclosure.
Figure 27:
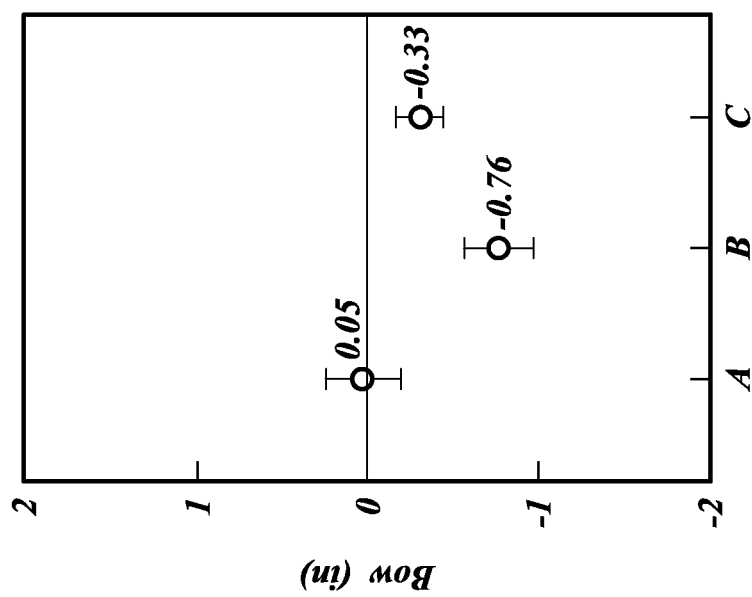

Deflection in Composite Wood Products Made Using Systems and Methods According to the Disclosure FIGS. 27 and 28 are a plots showing deflection of beams made using systems and methods according to the disclosure. The beams were cut from a billet in the same manner as reference in Example 1 (see FIG. 25). After being cut, deflection was measured in the same manner as described in Example 1.

The beams representing the data shown in FIG. 27 were produced using systems and methods according to the disclosure such as those shown in FIGS. 7 and 15. Four 15 kW microwave windows (having a total power of 60 kW) were used to apply side preheating microwave energy at a frequency of approximately 915 MHz. The microwave windows were positioned adjacent to the boundary planes 2502 and 2504. The line speed for the second billet group was approximately 7 feet per minute. FIG. 27 shows deflection measured in beam A, beam B, and beam C.

The beams representing the data shown in FIG. 28 were produced using systems and methods according to the disclosure such as those shown in FIGS. 7 and 15. Four 15 kW microwave windows (having a total power of 60 kW) were used to apply side preheating microwave energy at a frequency of approximately 915 MHz. The microwave windows were positioned adjacent to the boundary planes 2502 and 2504. The line speed for the second billet group was approximately 7 feet per minute. FIG. 28 shows deflection measured in beam A, beam B, and beam C.

Example 3

Deflection Over Time in Composite Wood Products Made Using Systems and Methods According to the Disclosure In a series of experiments, deflection over time was measured in composite wood products made using systems and methods according to the disclosure. Fifteen beams were produced using systems and methods according to the disclosure such as those shown in FIGS. 7 and 15. Beams were cut from a billet in the same manner as reference in Example 1 (see FIG. 25). Four 15 kW microwave windows (having a total power of 60 kW) were used to apply side preheating microwave energy at a frequency of approximately 915 MHz. The microwave windows were positioned adjacent to the boundary planes 2502 and 2504. The line speed for the second billet group was approximately 7 feet per minute.

Figure 29:
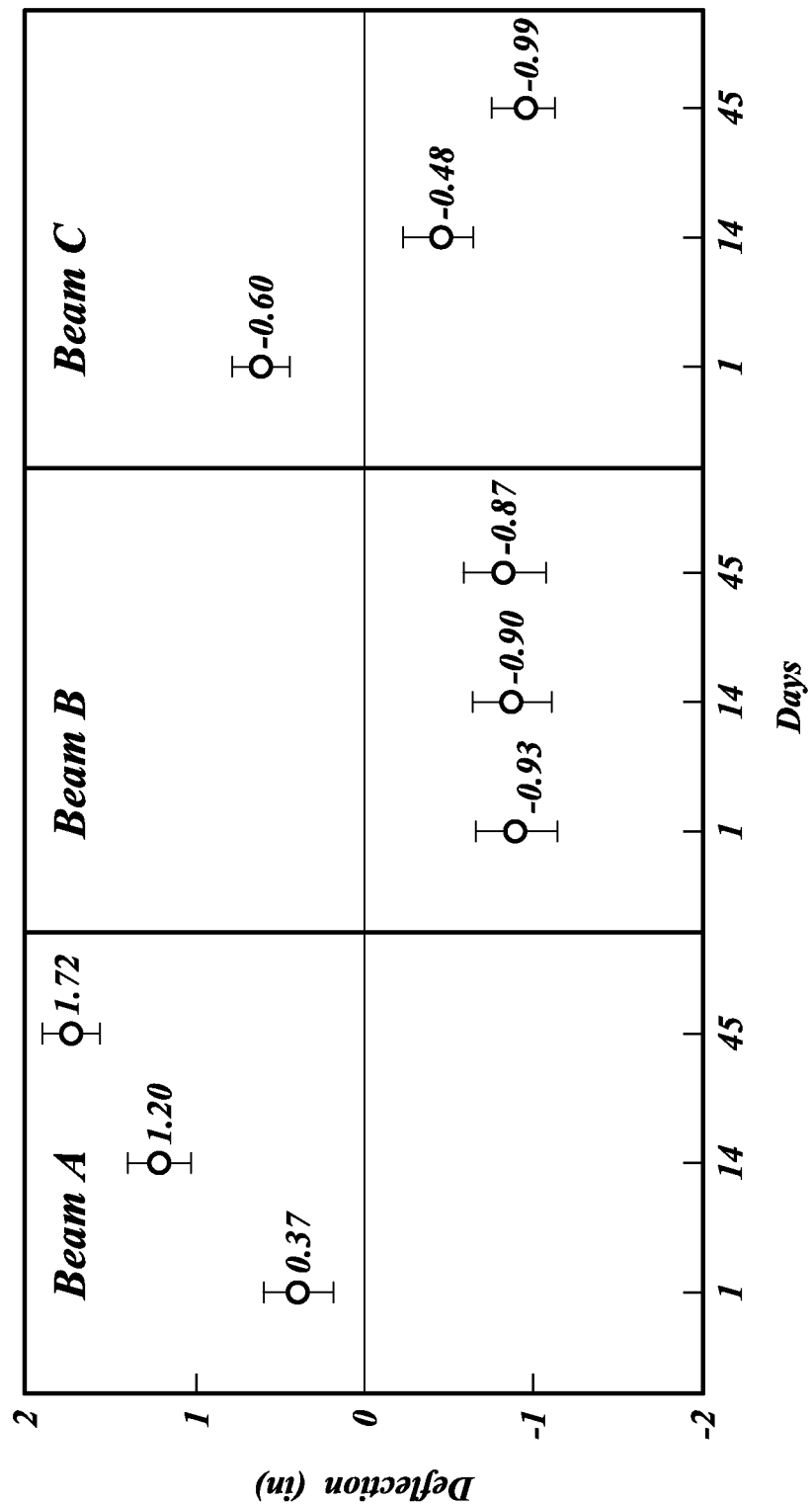
FIG. 29 is a plot showing deflection of beams made using systems and methods according to the disclosure over time.

After cutting, the deflection of the beams was measured using techniques described in the previous examples. The beams were then placed in a warehouse where they were stored under consistent temperature and humidity conditions for 14 days. The deflection of the beams was measured again after 14 days and the beams were stored for a total of 45 days. After 45 days, the deflection was measured for a third time. FIG. 29 shows the measured in beam A, beam B, and beam C at the following time periods: 1 day, 14 days, and 45 days. As demonstrated by the data, the reduced bowing effect remains relatively stable over time.

We claim:

1. A method for manufacturing a composite wood product comprising the steps of:
   forming a mat from a plurality of wood elements and an adhesive, the mat having first and second side faces extending along the longitudinal axis of the mat, the mat being divided into three or more sections defined by two or more boundary planes, the two or more boundary planes being substantially perpendicular to the first and second side faces of the mat;
   moving the mat in a machine direction, the machine direction being substantially parallel to the longitudinal axis;
   positioning a first side energy generator assembly along the first side of the mat at the first boundary plane and a second side energy generator assembly along the first side of the mat at the second boundary plane, and positioning a third side energy generator assembly along the second side of the mat at the first boundary plane and a fourth side energy generator assembly along the second side of the mat at the second boundary plane;
   applying energy to the mat with the first, second, third, and fourth side energy generator assemblies in first, second, third, and fourth horizontal directions, each of the first, second, third, and fourth horizontal directions being substantially perpendicular to the machine direction;

compressing the mat to form a billet; and cutting the billet along first and second cutting planes that substantially correspond to the first and second boundary planes to form first, second, and third beams.

2. The method of claim 1 wherein the first, second, third, and fourth side energy generator assemblies each comprise one or more microwave windows, the one or more microwave windows each being operably connected to one or more microwave generators.

3. The method of claim 1 wherein the step of applying energy to the mat with the first, second, third, and fourth side energy generator assemblies in first, second, third, and fourth horizontal directions further comprises creating a heating pattern in the mat that is substantially symmetric about each of the first and second boundary planes.

4. The method of claim 1, further comprising the step of applying energy to the mat with one or more top/bottom energy generator assemblies in one or more vertical directions, the one or more vertical directions being substantially perpendicular to the longitudinal axis, before compressing the mat to form the billet.

5. The method of claim 1 wherein the step of forming the mat further comprises forming the mat to have a width W and an initial thickness T1, the initial thickness T1 being greater than the width W.

6. A method for manufacturing a composite wood product comprising the steps of:

forming a mat from a plurality of wood elements and an adhesive, the mat having a width W measured substantially perpendicular to a longitudinal axis of the mat and an initial thickness T1, wherein the mat further comprises:
  a top face extending along the longitudinal axis;
  a bottom face that is substantially parallel to the top face;
  a first side face that is substantially perpendicular to the top face; and
  a second side face that is substantially parallel to the first side face;

estimating positions of first and second boundary planes on the mat, the first and second boundary planes being substantially parallel to the top face; and positioning a first energy generator assembly adjacent to the first side face of the mat in substantial alignment with the first boundary plane and positioning a second energy generator assembly adjacent to the first side face of the mat in substantial alignment with the second boundary plane so that after energy application, the first side face of the mat has a first heating pattern that is substantially symmetrical about the first boundary plane and a second heating pattern that is substantially symmetrical about the second boundary plane;

positioning a third energy generator assembly adjacent to the second side face of the mat in substantial alignment with the first boundary plane and positioning a fourth energy generator assembly adjacent to the second side face of the mat in substantial alignment with the second boundary plane so that after energy application, the second side face of the mat has a third heating pattern that is substantially symmetrical about the first boundary plane and a fourth heating pattern that is substantially symmetrical about the second boundary plane;

moving the mat in a machine direction, the machine direction being substantially parallel to the longitudinal axis;

adjusting temperature across at least a portion of the width W of the mat with the first, second, third, and fourth energy generator assemblies;

compressing the mat into a billet having a final thickness T2; and cutting the billet along first and second cutting planes, each of the first and second cutting planes being substantially parallel to the longitudinal axis, thereby forming two or more beams, wherein the first cutting plane is in substantial alignment with the first boundary plane and the second cutting plane is in substantial alignment with the second boundary plane.

7. The method of claim 6 wherein each of the first, second, third, and fourth energy generator assemblies are selected from the group consisting of microwave generator assemblies, hot air generator assemblies, and hot steam generator assemblies.

8. The method of claim 6 wherein the step of forming the mat comprises forming the mat so that the initial thickness T1 is greater than the width W.

9. The method of claim 6 wherein the step of adjusting temperature across the width W of the mat further comprises the step of applying microwave energy in a direction substantially perpendicular to the longitudinal axis, the microwave energy having a frequency of about 200 MHz to about 10 GHz.

10. The method of claim 6 wherein each of the first, second, third, and fourth energy generator assemblies are operably connected to one or more microwave generators.

\* \* \* \* \*